(12) United States Patent
Huang

(10) Patent No.: US 7,664,380 B2
(45) Date of Patent: *Feb. 16, 2010

(54) CAMERA MODULE

(75) Inventor: Yao-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 378 days.

This patent is subject to a terminal disclaimer.

(21) Appl. No.: 11/425,574

(22) Filed: Jun. 21, 2006

(65) Prior Publication Data

US 2007/0189744 A1 Aug. 16, 2007

(30) Foreign Application Priority Data

Feb. 10, 2006 (TW) ............... 95104580 A

(51) Int. Cl.
*G03B 17/00* (2006.01)
*H04N 5/228* (2006.01)
(52) U.S. Cl. .............. 396/55; 396/542; 348/208.4
(58) Field of Classification Search .......... 396/50, 396/52, 55, 542; 348/208.99, 208.4, 208.5, 348/208.7, 208.11, 208.12, 373–376
See application file for complete search history.

(56) References Cited

U.S. PATENT DOCUMENTS

| 5,266,988 | A | 11/1993 | Washisu | |
|---|---|---|---|---|
| 6,940,542 | B2 * | 9/2005 | Kitazawa et al. | 348/208.99 |
| 7,268,336 | B2 * | 9/2007 | Hsieh et al. | 250/208.1 |
| 7,295,770 | B2 * | 11/2007 | Uenaka et al. | 396/55 |
| 7,315,015 | B2 * | 1/2008 | Hsieh et al. | 250/208.1 |
| 2006/0017815 | A1 | 1/2006 | Stavely et al. | |
| 2006/0092285 | A1 * | 5/2006 | Shin | 348/208.7 |

FOREIGN PATENT DOCUMENTS

| CN | 1731829 | 2/2006 |
|---|---|---|
| JP | 2003111449 | 11/2003 |

* cited by examiner

*Primary Examiner*—W. B. Perkey
*Assistant Examiner*—Minh Q Phan
(74) *Attorney, Agent, or Firm*—Thomas, Kayden, Horstemeyer & Risley

(57) ABSTRACT

A camera module comprises a main body, a cone disposed in the main body to accommodate a lens, a base joined to the cone, a frame movably disposed on the base, an image detection unit fixed to the frame and moving on the base via the frame, a first circuit board joined to the image detection unit and moving on the base via the image detection unit, a second circuit board disposed on the main body, and a flexible circuit board with one end connected to the first circuit board and the other end connected to the second circuit board. The flexible circuit board has a plurality of slits dividing the flexible circuit board into a plurality of strips. The slits are parallel and extend from the first circuit board to the second circuit board.

8 Claims, 11 Drawing Sheets

CAMERA MODULE

BACKGROUND OF THE INVENTION

1. Field of the Invention

The invention relates to a camera module, and in particular to a camera module having a flexible circuit board with a plurality of slits.

2. Description of the Related Art

As shown in FIG. 1, U.S. Pat. No. 5,266,988 discloses an image shake suppressing device for a camera. The image shake suppressing device is mounted in a lens 32. When the camera is used, angular velocity meters 33$p$ and 33$y$ measure the angular velocity of the moving camera and provide the measured data to a circuit to drive driving part 37$p$ and 37$y$ moving the lens 32 along a vertical optical axis, thereby compensating or suppressing blur due to vibration of the camera. When the motion suppressing device is not used, power is still provided to the driving parts 37$p$ and 37$y$. This results in considerable power consumption.

As shown in FIG. 2, Japan patent No. 3551174 discloses a moving mechanism. The moving mechanism employs piezoelectric elements 35 to drive a shaft 34 to move an image detection unit 16, such as CCD, in a vertical direction, such that blur is compensated or suppressed, and it is applicable to any lens. The piezoelectric elements must be driven by voltage to move the CCD. As the CCD, however, is heavier than a single lens, a large piezoelectric element is needed, increasing the volume of the camera.

BRIEF SUMMARY OF INVENTION

A detailed description is given in the following embodiments with reference to the accompanying drawings.

An embodiment of the camera module of the invention comprises a main body, a cone disposed in the main body to accommodate a lens, a base joined to the cone, a frame movably disposed on the base, an image detection unit fixed to the frame and moving on the base via the frame, a first circuit board joined to the image detection unit and moving on the base via the image detection unit, a second circuit board disposed on the main body, and a flexible circuit board with one end connected to the first circuit board and the other end connected to the second circuit board. The flexible circuit board has a plurality of slits dividing the flexible circuit board into a plurality of strips. The slits are parallel and extend from the first circuit board to the second circuit board.

The frame comprises a first guide element by which the frame is joined to the base and moved along a first axis, at least one first coil disposed on the frame, at least one first magnet fixed to the base and opposite the first coil, and a first Hall element disposed on the frame adjacent to the first coil. Magnetic flux variation is generated between the first coil and the first magnet by providing voltage to the first coil, thereby moving the first guide element in the first axis.

The frame further comprises a moving frame joined to the base by the first guide element and moving in the first axis relative to the base, and a seat disposed on the moving frame capable of moving relative to the base. The first coil and the first Hall element are disposed on the moving frame.

The second guide element comprises a plurality of second holding portions disposed on the seat, and a pair of second guide bars held parallel by the second holding portions and fixed to the moving frame, whereby the moving frame is joined to the seat, and the seat moves along the axis of the second guide bar.

The axis of the second guide bar is perpendicular to the axis of the first guide bar.

The first magnet comprises an N pole and an S pole disposed in the axis of the first guide bar.

The second magnet comprises an N pole and an S pole disposed in the axis of the second guide bar.

The first guide element comprises a plurality of first holding portions disposed on a pair of sidewalls of the moving frame, and a pair of first guide bars held parallel by the first holding portions and fixed to the base, whereby the moving frame is joined to the base, and the moving frame moves in the axis of the first guide bar.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Before the description, it is noted that location language, such as first axis X, second axis Y, or third axis Z, is based on the coordinate of each individual figure, and the first axis X, second axis Y, and the third axis Z are orthogonal.

Figure 1:
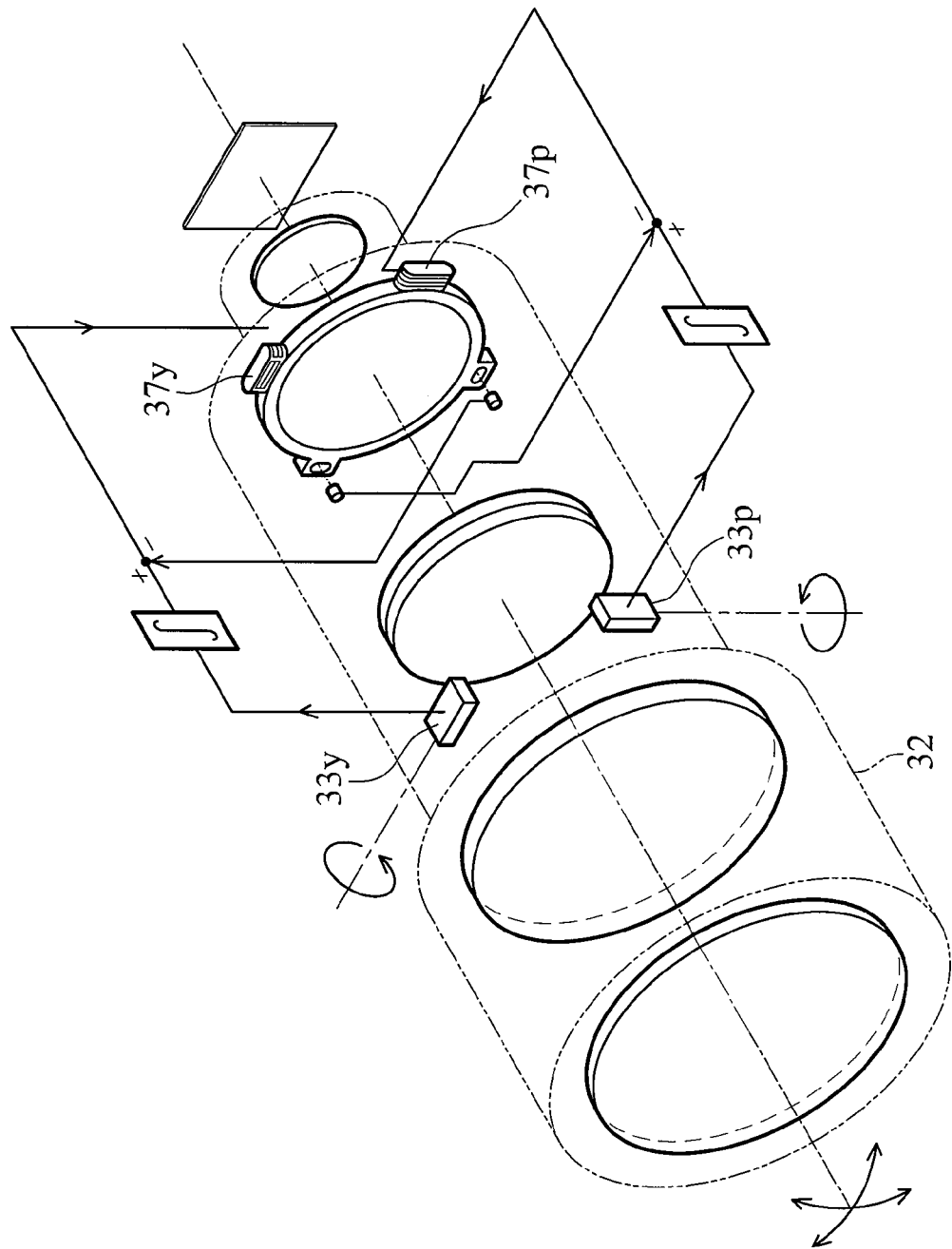
FIG. 1 depicts an image shake suppressing device disclosed in U.S. Pat. No. 5,266,988.
Figure 2:
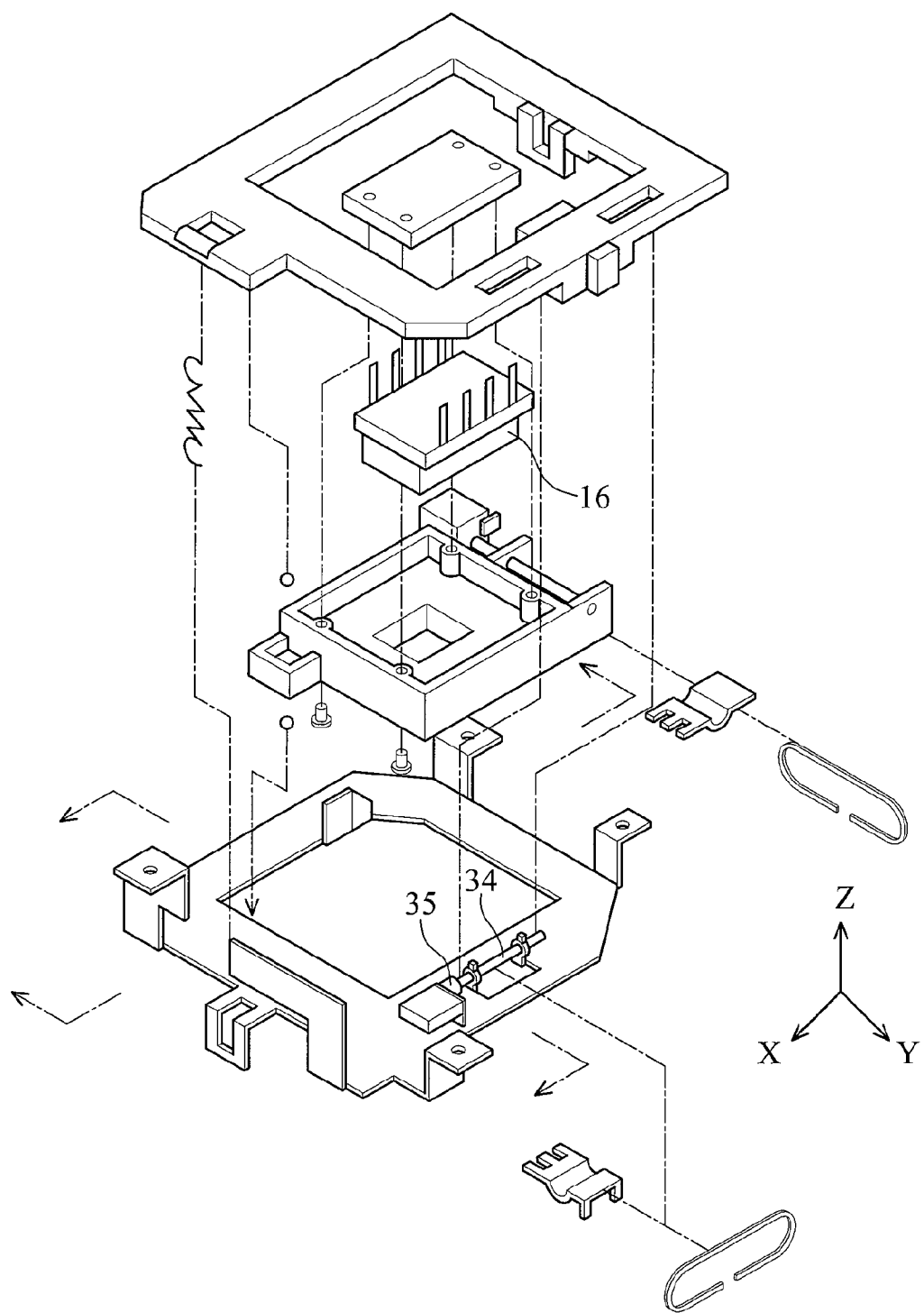
FIG. 2 depicts a moving mechanism disclosed in Japan Patent No. 3551174.
Figure 3A:
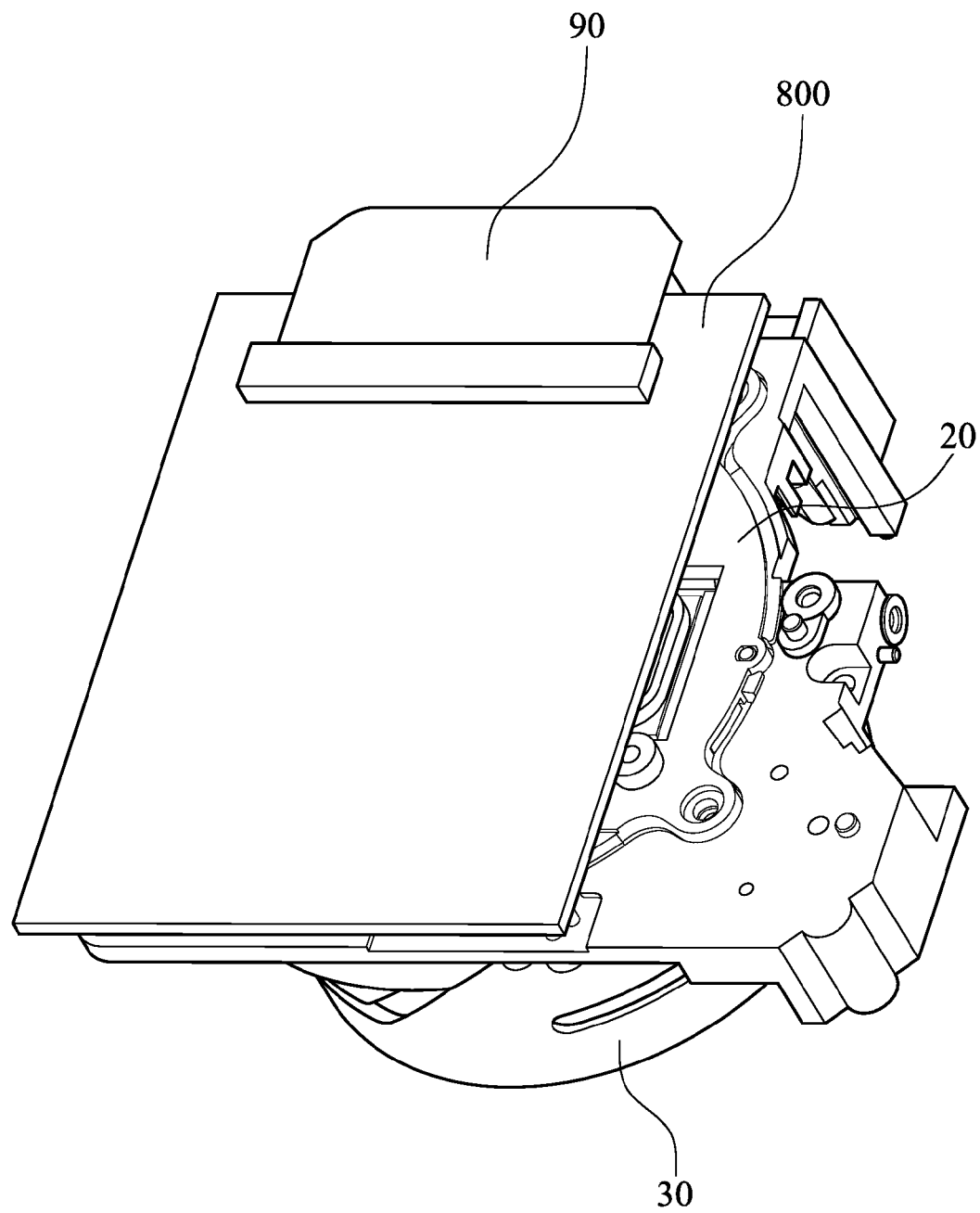
FIGS. 3$a$ and 3$b$ are perspective views of an embodiment of a camera module of the invention.
Figure 3B:
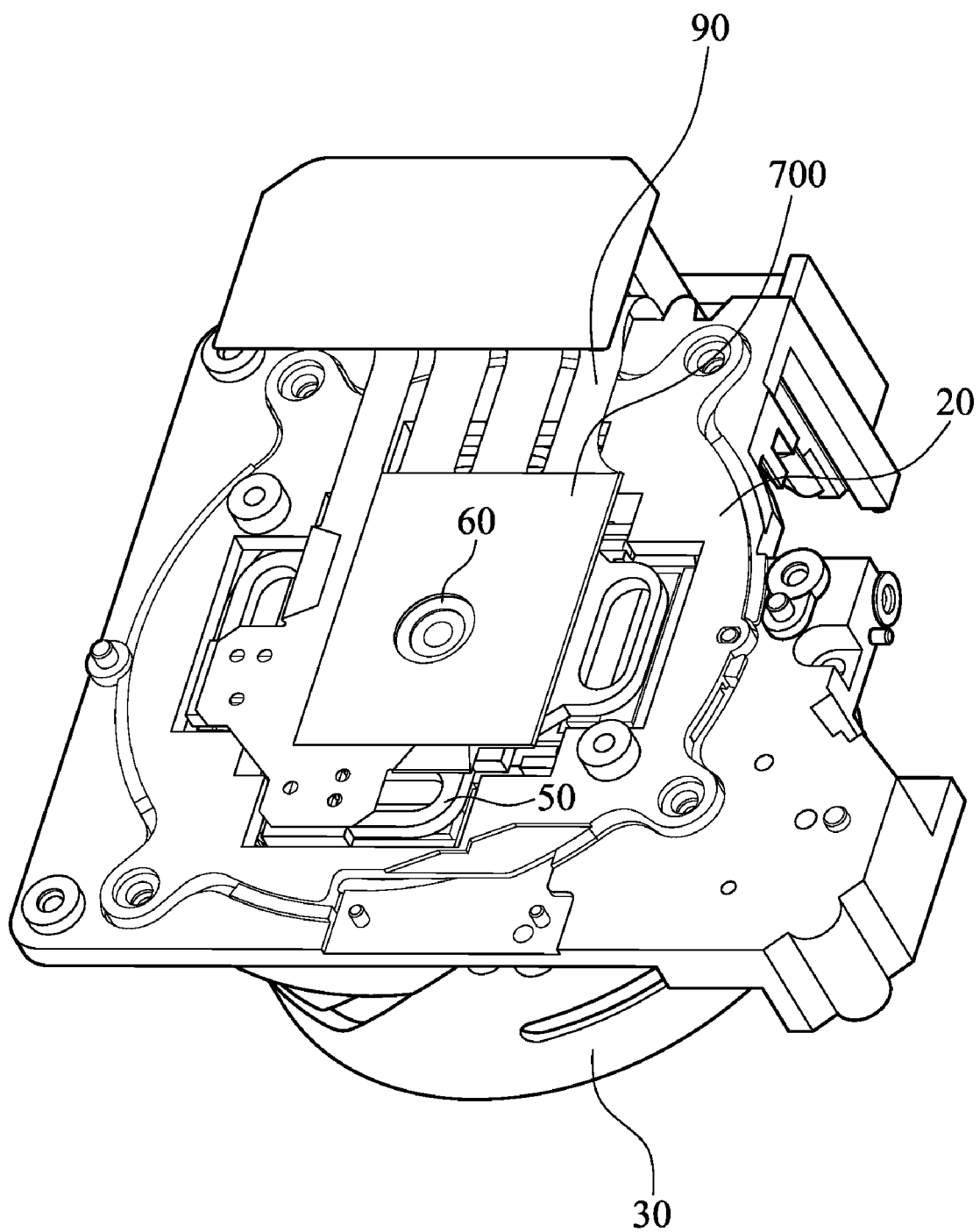

Referring to FIGS. 3$a$, 3$b$ and 4, the camera module of the invention comprises a main body (not shown), a cone 30 disposed on the main body, a base 20 joined to the cone 30, a frame 50 joined to the base 20, an image detection unit 60 disposed on the frame 50, such as a CCD, a first circuit board 700 joined to the image detection unit 60, a second circuit board 80 disposed on the main body, and a flexible circuit board 90 connecting to the first circuit board 700 and the second circuit board 800. The frame 50 is disposed between the flexible circuit board 90 and the cone 30 and joined to the base 20. The frame 50 comprises a plurality of coils (not shown). Magnetic force is generated between the coils and magnets 21A, 21B, 21C and 21D by signals provided to the coils. The magnetic force drives the frame 50 to move the image detection unit 60, whereby the blur is compensated.

Figure 4:
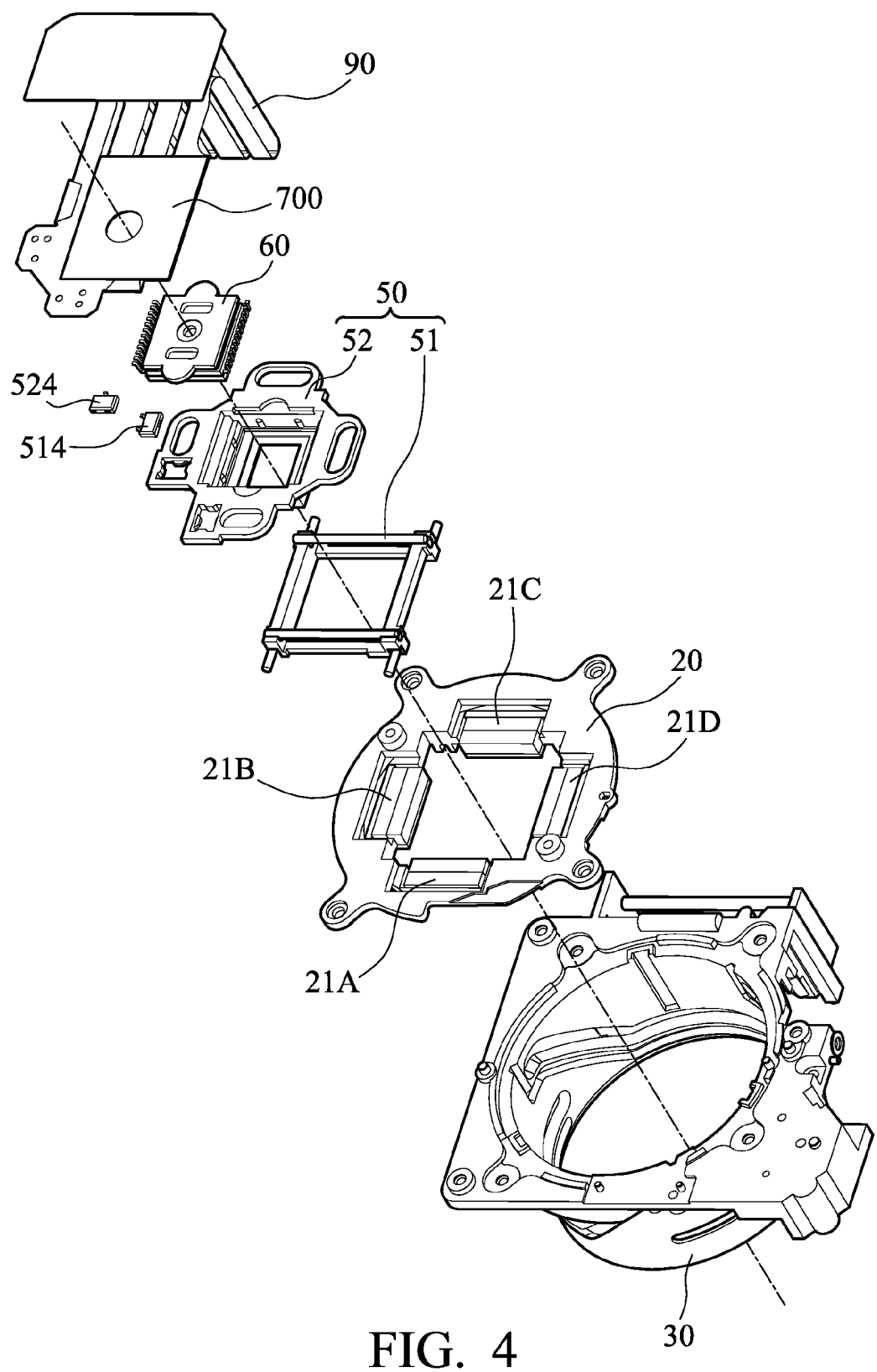
FIG. 4 is an exploded view of an embodiment of a camera module of the invention.

In FIG. 4, the frame 50 comprises a moving frame 51 and a seat 52. First Hall element 514 and second Hall element 524 are disposed on the seat 52.

Figure 5:
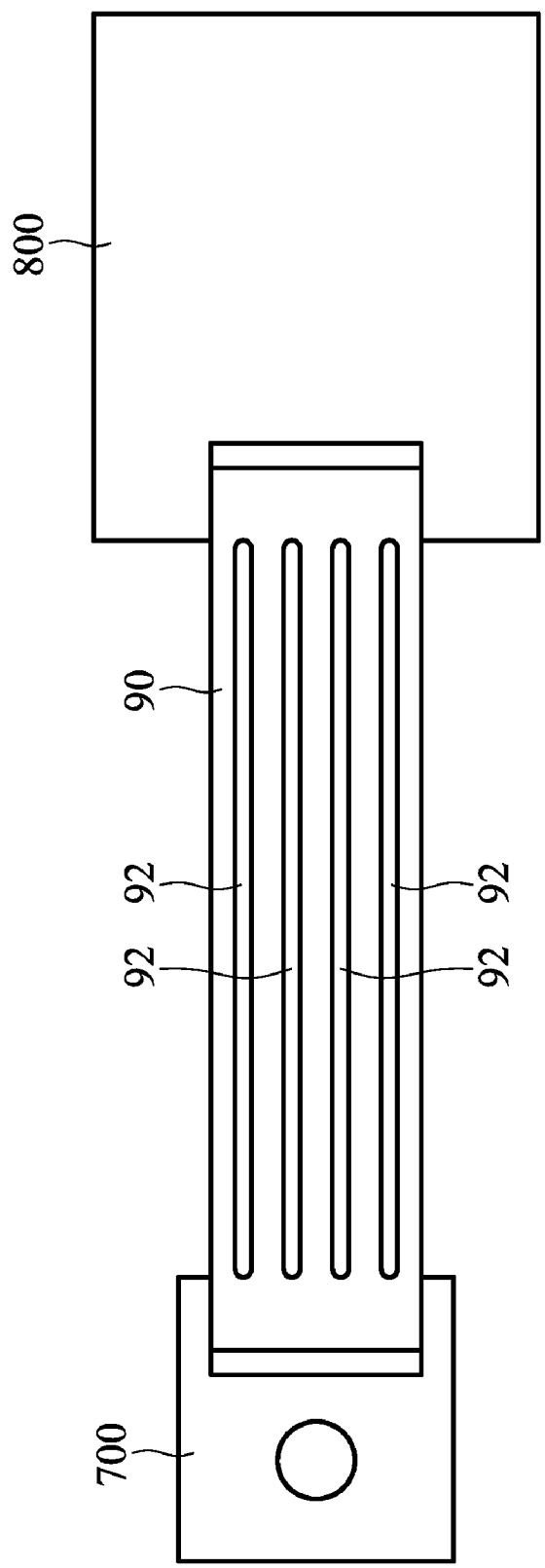
FIG. 5 is a schematic view of the flexible circuit board of the invention connected to a first circuit board and a second circuit board.

FIG. 5 depicts the flexible circuit board 90 joined to the first circuit board 700 and the second circuit board 800. The flexible circuit board 90 has a plurality of slits 92 dividing the flexible circuit board 90 into a plurality of strips. In this embodiment, the slits 92 are parallel. The length and the width of the slits 92 are not limited. As the first circuit board 700 is disposed on the image detection unit 60 moving on the base 20 with the frame 50 and the second circuit board 800 is disposed on the main body, the flexible circuit board 90 is pulled by the second circuit board 800 to retard the movement of the image detection unit 60. The flexible circuit board 90 is divided into a plurality of strips by the slits 92, whereby the force pulling the image detection unit 60 from the flexible circuit board 90 is thus reduced.

Figure 6:
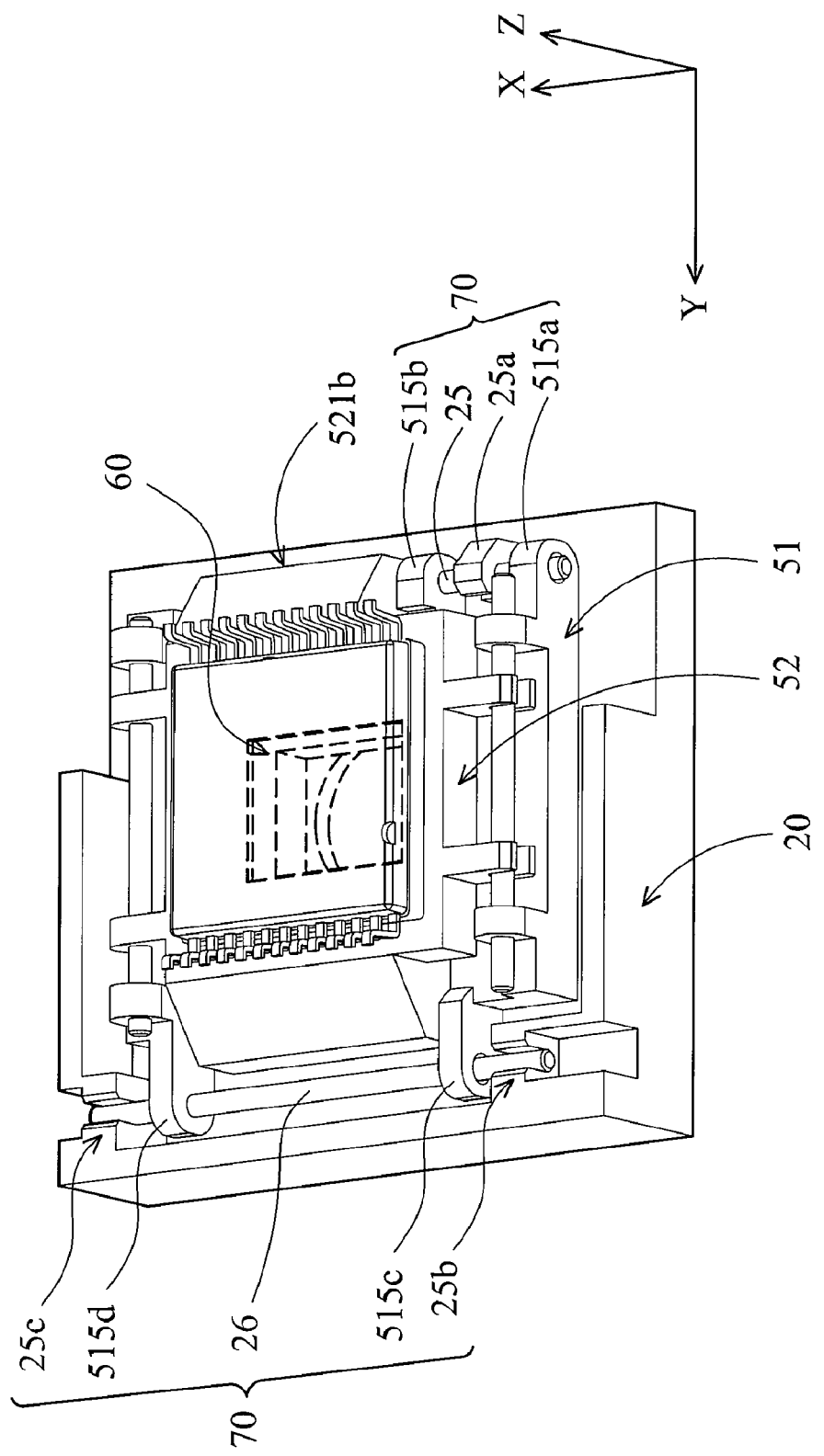
FIG. 6 is a rear view of a moving frame of an embodiment of the invention.

Referring to FIG. 6, the frame 50 comprises a moving frame 51 with a hollow portion 29, and a seat 52 movably disposed on the moving frame 51. The image detection unit 60, such as CCD, is disposed on the seat 52. In addition, a detection surface of the image detection unit 60 faces the lens 30, i.e. in the third axis Z.

Figure 7:
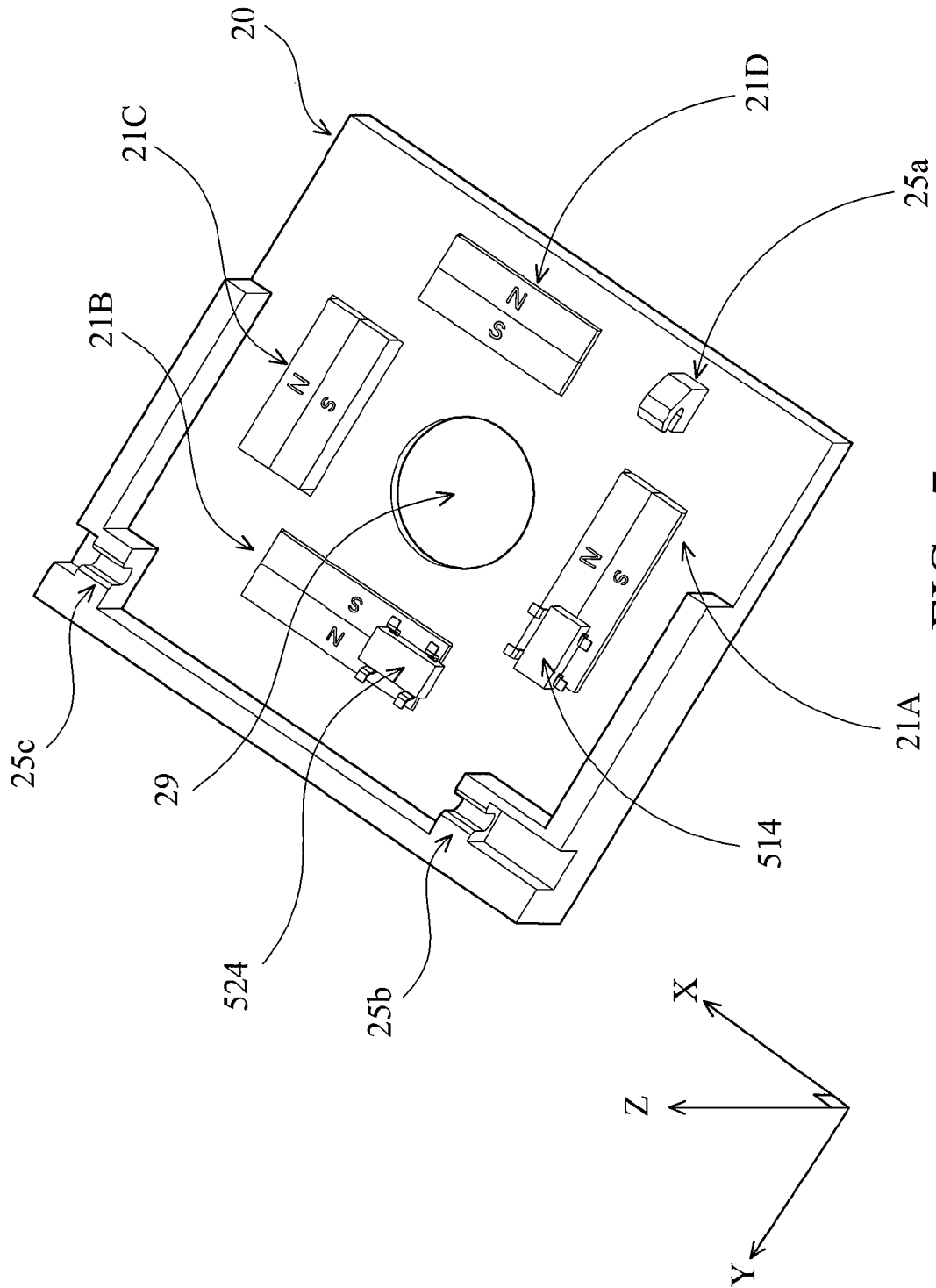
FIG. 7 is a perspective view of a Hall element and a magnets.
Figure 8:
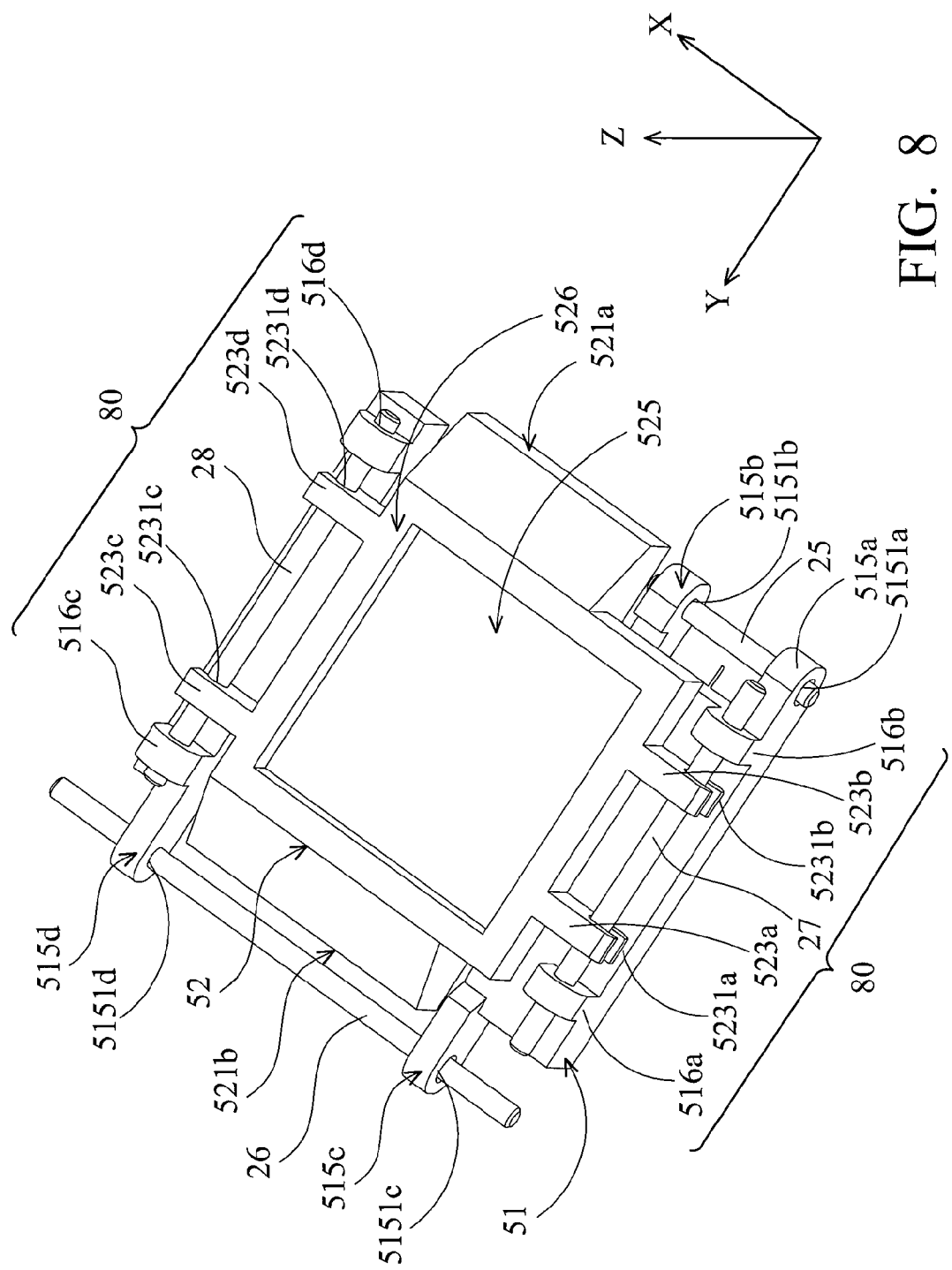
FIG. 8 is a perspective view of a seat and moving frame of the invention.

Referring to FIGS. 7 and 8, the base 20 has a pair of first magnets 21A and 21C, a pair of second magnets 21B and 21D and a pair of parallel first shafts 25 and 26. The first magnets 21A and 21C are parallel on two sides of the hollow portion 29. The N pole and the S pole of the first magnet 21A are disposed along the second axis Y, as are the N pole and the S pole of the other first magnet 21C. The second magnets 21B and 21D are also disposed parallel on two sides of the hollow portion 29. The N pole and the S pole of the second magnet 21B are disposed along the first axis X, as are the N pole and the S pole of the other second magnet 21D. In addition, the S poles of the first magnets 21A and 21C face the hollow portion 29, and the S poles of the second magnets 21B and 21D faces the hollow portion 29. In this embodiment, the relative positions of the first magnets 21A, 21C and the second magnets 21B, 21D are not limited. The first magnets 21A and 21C and second magnets 21B and 21D are fixed to the base 20 via adhesive, such as UV adhesive or thermal adhesive. The first magnet 21A and the second magnet 21B protrude from the side of the base 20 facing the solenoid 40.

Figure 9:
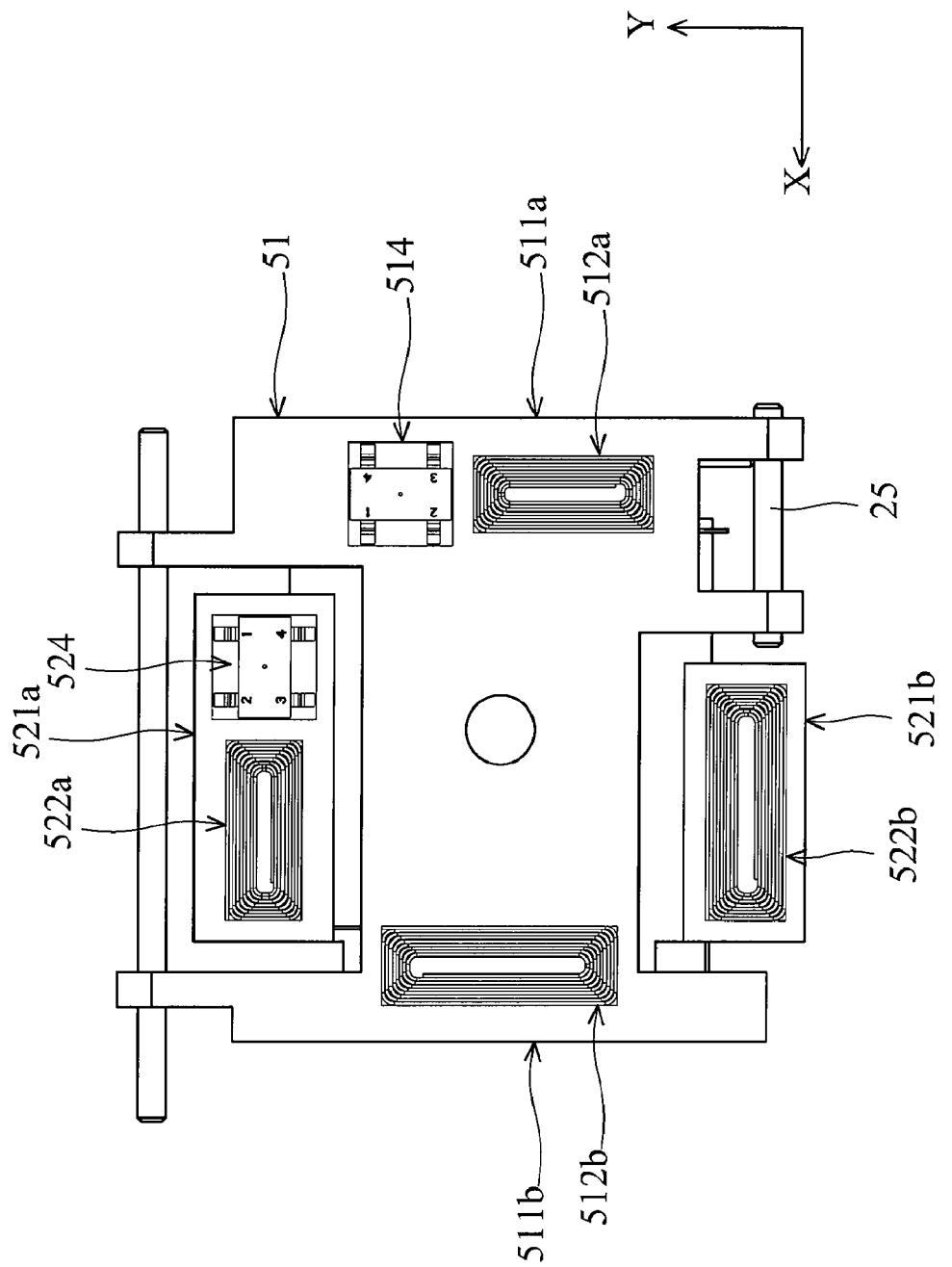
FIG. 9 is a top view of a camera depicting coils and Hall elements disposed on the moving frame and the base.

Referring to FIGS. 8 and 9, the seat 52 has two wing portions 521a and 521b. A pair of second coils 522a, 522b are disposed on the wing portions 521a and 521b respectively. A second Hall element 524 is disposed on the wing portion 521a. A second coil 522a is disposed on the wing portion 521a, and the second Hall element 524 is also disposed on the wing portion 521a adjacent to the second coil 522a. The other second coil 522b is disposed on the other wing portion 521b. The second coils 522a and 522b are substantially rectangular and parallel longitudinally. The moving frame 51 has two wing portions 511a and 511b. A pair of first coils 512a, 512b are disposed on the wing portions 511a and 511b respectively. A first Hall element 514 is disposed on the wing portion 511a. The first coil 512a is disposed on the wing portion 511a, and the first Hall element 514 is also disposed on the wing portion 511a adjacent to the first coil 512a. The other first coil 512b is also disposed on the wing portion 511b. The first coils 512a and 512b are substantially rectangular and parallel longitudinally. Two first holding portions 515a and 515b are disposed on the external sides of the moving frame 51 adjacent to the wing portion 521a. The first holding portions 515a and 515b have holes 5151a and 5151b respectively. Two first holding portions 515c and 515d are disposed on the wing portion 521b. The first holding portions 515c and 515d have holes 5151c and 5151d respectively.

A pair of first shafts 25 and 26 are parallel. The shorter first shaft 25 is disposed near the magnets 21A and 21D. The longer first shaft 26 extends through the holes 5151c and 5151d and is fixed to the holding portions 25b and 25c of the base 20. The shorter first shaft 25 extends through the holes 5151a and 5151b and is fixed to the holding portion 25a of the base 20. The first shafts 25, 26 and the holding portions 25a, 25b, 25c, 515a, 515b, 515c, 515d constitute a first guide element 70 along which the moving frame 51 moves along the first axis X.

Referring to FIGS. 8 and 9, the seat 52 further has a hollow portion 525 in which the image detection unit 60 is disposed. The seat 52 further has a circuit (not shown) to which the image detection unit 60 is electrically connected, and a rectangular frame 526 fixed to the circuit board and surrounding the image detection unit 60. The rectangular frame 526 and a pair of walls 5261 and 5262 have second holding portions 523a, 523b, 523c and 523d. The second holding portions 523a, 523b, 523c and 523d have holes 5231a, 5231b, 5231c and 5231d respectively. A pair of second shafts 27 and 28 is disposed along the second axis Y. The second shaft 27 is held by the holding portions 516a and 516b and inserted into the holes 5231a and 5231b. The other second shaft 28 is held by the holding portions 516c and 516d and inserted into holes 5231c and 5231d, whereby the moving frame 51 is joined to the seat 52. The second shafts 27, 28 and the holding portions 516a, 516b, 516c, 516d, 523a, 523b, 523c and 523d constitute a second guide element 80 along which the seat 52 moves along the second axis Y.

Figure 10:
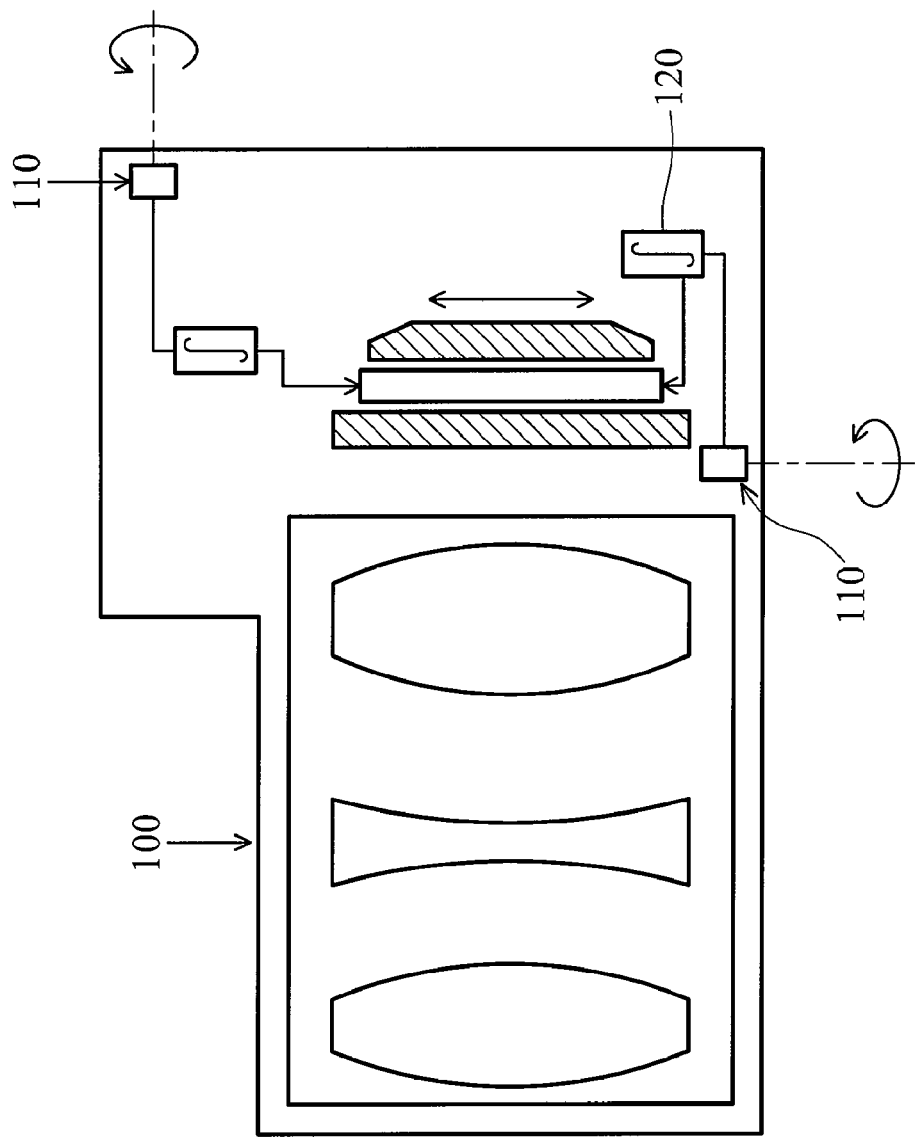
FIG. 10 depicts a camera with a camera module of the invention.

FIG. 10 depicts a camera employing the camera module of the invention. A camera 100 has a motion sensor 110, such as an angular acceleration element or a linear acceleration element. The motion sensor 110 detects movement of the camera 100 and provides a voltage signal to the coils 512a, 512b, 522a and 522b via a PWM circuit and a digital circuit. The coils 512a, 512b, 522a and 522b generate variable magnetic fields interacting with the first magnet 21A, 21C and the second magnets 21B, 21D, whereby the frame 51 and the seat 52 move along the first axis X and in the second axis Y respectively relative to the base 20. The image detection unit 60 moves along the first and second axis X and Y, thereby preventing blur.

Referring to FIG. 7 again, when the camera 100 is idle, the frame 50 is also idle and one half of the Hall element 514 is disposed on the N pole of the first magnet 21A and the other half of the first Hall element 514 is disposed on the S pole of the first magnet 21A. One half of the second Hall element 524 is disposed on the N pole of the second magnet 21B, and the other half of the second Hall element 524 is disposed on the S pole of the second magnet 21B. The first and second Hall elements detect no magnetic field variations. When the camera 100 is moved, the coils 512a, 512b, 522a and 522b interact with the first and second magnets 21A, 21B, 21C and 21D to move the frame 51 and the seat 52 in the first and second axis X and Y. The first and second Hall elements 514 and 524 detect magnetic field variation, thereby calculating displacement and motion frequency of the seat 52 to modify the voltage signal of the PWM circuit or the digital circuit.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A camera module, comprising:
a main body;
a cone disposed in the main body to accommodate a lens;
a base joined to the cone;

a frame movably disposed on the base and comprising a first guide element by which the frame is joined to the base and moved along a first axis, a moving frame joined to the base by the first guide element and moving along the first axis relative to the base;

a seat disposed on the moving frame capable of moving relative to the base;

at least one first coil disposed on the moving frame;

at least one first magnet fixed to the base and opposite the first coil; and a first Hall element disposed on the moving frame adjacent to the first coil, wherein the seat comprising a second guide element by which the seat is joined to the moving frame and moves along a second axis relative to the moving frame;

at least one second coil disposed on the seat; and at least one second magnet disposed on the base opposite the second coil and a second Hall element disposed on the seat adjacent to the second coil;

an image detection unit fixed to the frame and moving on the base via the frame;

a first circuit board joined to the image detection unit and moving on the base via the image detection unit;

a second circuit board disposed on the main body; and a flexible circuit board with one end connected to the first circuit board and the other end connected to the second circuit board, wherein the flexible circuit board has a plurality of slits dividing the flexible circuit board into a plurality of strips, wherein magnetic flux variation is generated between the first coil and the first magnet by providing voltage to the first coil, thereby moving the first guide element along the first axis, and magnet flux variation is generated between the second magnet and the second coil by providing voltage to the second coil to move the seat along the second axis via the second guide element.

2. The camera module as claimed in claim 1, wherein the slits are parallel.

3. The camera module as claimed in claim 1, wherein the slits extend from the first circuit board to the second circuit board.

4. The camera module as claimed in claim 1, wherein the second guide element comprises:
   a plurality of second holding portions disposed on the seat; and
   a pair of second guide bars held parallel by the second holding portions and fixed to the moving frame, whereby the moving frame is joined to the seat, and the seat moves along the axis of the second guide bar.

5. The camera module as claimed in claim 4, wherein the axis of the second guide bar is perpendicular to the axis of the first guide bar.

6. The camera module as claimed in claim 5, wherein the first magnet comprises an N pole and an S pole disposed in the axis of the first guide bar.

7. The camera module as claimed in claim 4, wherein the second magnet comprises an N pole and an S pole disposed in the axis of the second guide bar.

8. The camera module as claimed in claim 1, wherein the first guide element comprises:
   a plurality of first holding portions disposed on a pair of sidewalls of the moving frame; and
   a pair of first guide bars held parallel by the first holding portions and fixed to the base, whereby the moving frame is joined to the base, and the moving frame moves in the axis of the first guide bar.

* * * * *